US005801209A

United States Patent [19]

Chung et al.

[11] Patent Number: 5,801,209
[45] Date of Patent: Sep. 1, 1998

[54] EPDM COMPOSITIONS AND PROCESS FOR PRODUCING SAME

[75] Inventors: Bin Chung, Nashua, N.H.; Bruce E. Mackay, Framingham, Mass.; Ivan Zlatko Podobnik, Nashua, N.H.

[73] Assignee: Cabot Corporation, Boston, Mass.

[21] Appl. No.: 911,779

[22] Filed: Aug. 15, 1997

Related U.S. Application Data

[62] Division of Ser. No. 317,208, Oct. 3, 1994, Pat. No. 5,700,845.

[51] Int. Cl.$^6$ ................ C08G 18/14; C08K 3/04
[52] U.S. Cl. ............ 521/99; 427/207.1; 427/407.1; 427/413; 524/496; 521/121; 521/125; 521/128; 521/130; 521/131; 521/133; 521/150
[58] Field of Search ................ 521/99, 121, 125, 521/128, 130, 131, 133, 150; 524/496; 427/207.1, 407.1, 413

[56] References Cited

U.S. PATENT DOCUMENTS 5,262,471  11/1993  Akao ........................ 574/496
5,700,845  12/1997  Chung et al. ............... 521/150

FOREIGN PATENT DOCUMENTS 4246440  9/1992  Japan .

WO 93/21270  10/1993  WIPO .

OTHER PUBLICATIONS

International Search Report from European Patent Office mailed Jan. 22, 1996, in PCT/US95/11640 (based on U.S. Appln. Serial No. 08/317,208).

*Primary Examiner*—John M. Cooney, Jr.

[57] ABSTRACT

Disclosed are foamable EPDM compositions comprising EPDM, a carbon black having a CTAB of about 50 to 60 m2/g and DBP of 90 to 115 cc/100 g and a blowing agent which are advantageous for use in applications where UHF microwave curing is utilized and for replacing foamable EPDM compositions incorporating similar amounts of conventional blends of carbon blacks. Also disclosed are foamed, cured EPDM compositions comprising: EPDM and a carbon black having a CTAB of about 50 to 60 m2/g and DBP of 90 to 115 cc/100 g which have advantageously lower sponge density and lower sponge compression set than EPDM compositions incorporating similar amounts of conventional low reinforcing carbon blacks. Further disclosed is a process for producing the foamed, cured EPDM compositions of the present invention. Additionally disclosed is use of the foamed, cured EPDM compositions of the present invention as weatherstripping.

7 Claims, No Drawings

EPDM COMPOSITIONS AND PROCESS FOR PRODUCING SAME

This application is a divisional of application U.S. Ser. No. 08/317,208, filed Oct. 3, 1994, now U.S. Pat. No. 5,700,845.

FIELD OF THE INVENTION

The present invention relates to:

foamable compositions comprising EPDM (ethylene propylene diene polymethylene rubber) certain carbon blacks and blowing agents;

foamed, cured EPDM compositions comprising EPDM and carbon black;

a process for producing foamed, cured EPDM compositions; and usage of foamed, cured EPDM compositions as weatherstrip.

The foamable EPDM compositions have improved UHF microwave receptivity. The foamed, cured EPDM compositions have improved sponge characteristics and a smooth surface (by visual observation).

BACKGROUND

Carbon blacks have been widely utilized as fillers and reinforcing pigments in the compounding and preparation of EPDM compositions. Carbon blacks are generally characterized on the basis of their properties including, but not limited to, their surface areas, surface chemistry, aggregate sizes, and particle sizes. The properties of carbon blacks are analytically determined by tests known to the art, including cetyltrimethyl ammonium bromide surface area (CTAB) and dibutyl phthalate adsorption (DBP).

In particular, carbon blacks have been widely utilized as fillers and reinforcing pigments in the compounding and preparation of EPDM compositions intended for use in sponge weatherstripping applications. Sponge weatherstrip refers to an EPDM composition which, after extruding or shaping, and curing, yields a profile that contains air pockets or cells and resembles a sponge.

UHF microwave curing is one of the curing methods used in the sponge weatherstrip manufacturing process. UHF microwave curing is becoming increasingly important due to its high heating efficiency and its compatibility with environmental and workplace regulatory requirements. As understood in the art, UHF microwave curing refers to a curing process utilizing ultra high frequency microwaves which are frequencies from about 300 to 300,000 megahertz (megacycles per second or "MHz").

Conventional low reinforcing carbon blacks such as the ASTM N550 carbon black, ASTM N650 carbon black, ASTM N660 carbon black, ASTM N762 carbon black, and ASTM N990 carbon black are widely used for incorporation into foamable EPDM compositions since such carbon blacks allow for easy expansion (foaming). However, EPDM compositions incorporating low reinforcing carbon blacks are not as receptive to UHF microwave curing as the foamable EPDM compositions of the present invention. As a result of being more receptive to UHF microwave curing, the foamable EPDM compositions of the present invention have a faster heating rate than the EPDM compositions incorporating similar amounts of low reinforcing carbon blacks.

In addition, the foamed, cured EPDM compositions of the present invention exhibit lower sponge density and lower sponge compression set than EPDM compositions incorporating similar amounts of low reinforcing carbon blacks. Further, the foamed, cured EPDM compositions of the present invention exhibit a smoother surface (by visual inspection) □than is characteristic of EPDM compositions incorporating similar amounts of low reinforcing carbon blacks.

SUMMARY OF THE INVENTION

We have discovered foamable EPDM compositions comprising:

EPDM;

a carbon black having a CTAB (cetyltrimethyl ammonium bromide surface area) of 50 to 60 $m^2/g$ (square meters per gram), and a DBP (dibutyl phthalate absorption value) of 90 to 115 cc/100 g (cubic centimeters of dibutyl phthalate per 100 grams carbon black); and a blowing agent, The foamable EPDM compositions of the present invention incorporate carbon black in an amount of 50–250 phr (parts by weight carbon black to 100 parts by weight EPDM). Preferably, the foamable EPDM compositions incorporate the carbon black in an amount of 100–200 phr.

The foamable EPDM compositions of the present invention are advantageous for use in applications where fast UHF microwave heating rate is desirable. One such application is automotive sponge weatherstripping.

A further advantage of the foamable EPDM compositions of the present invention is that the foamable EPDM compositions have improved performance properties as compared to EPDM compositions incorporating conventional blends of low reinforcing carbon blacks.

We have also discovered foamed, cured EPDM compositions comprising:

EPDM; and a carbon black having a CTAB of 50 to 60 $m^2/g$, and a DBP of 90 to 115 cc/100 g, The foamed, cured EPDM compositions of the present invention incorporate carbon black in an amount of 50–250 phr. Preferably the foamed, cured EPDM compositions incorporate carbon black in an amount of 100–200 phr.

The foamed, cured EPDM compositions of the present invention have advantageously low sponge density and low sponge compression set in comparison to EPDM compositions incorporating similar amounts of conventional low reinforcing carbon blacks.

A further advantage of the foamed, cured EPDM compositions of the present invention is that the foamed, cured EPDM compositions have improved performance properties as compared to EPDM compositions incorporating similar amounts of conventional blends of low reinforcing carbon blacks.

We have further discovered a process for producing foamed, cured EPDM compositions comprising:

mixing EPDM, a carbon black having a CTAB of 50 to 60 $m^2/g$, and a DBP of 90 to 115 cc/100 g and a blowing agent, and foaming and curing the resulting mixture, wherein the carbon black is present in an amount of 50–250 phr.

Preferably the process further comprises the step of extruding or shaping the resulting mixture of the EPDM, the carbon black and the blowing agent prior to curing the composition. Also preferred is the process of the present invention wherein UHF microwave curing is utilized in curing the resulting mixture of the EPDM, the carbon black and the blowing agent. Further preferred is utilizing an amount of carbon black of 100–200 phr in the process for producing foamed, cured EPDM compositions of the present invention.

We have further discovered an advantageous use for the foamed, cured EPDM compositions of the present invention as weatherstripping. According to the present invention, a process for weatherstripping comprises:

sealing a surface with a foamed, cured EPDM composition comprising EPDM and a carbon black having a CTAB of 50 to 60 m$^2$/g, and a DBP of 90 to 115 cc/100 g, wherein carbon black is present in an amount of 50–250 phr. Preferably, in the process for weatherstripping of the present invention, the carbon black is present in an amount of 100–200 phr.

Other advantages of the present invention will become apparent from the following more detailed description of the invention.

DETAILED DESCRIPTION OF THE INVENTION

As set forth above, the present invention provides foamable EPDM compositions; foamed, cured EPDM compositions; processes for producing foamed, cured EPDM compositions; and a use of the foamed, cured EPDM compositions as weatherstripping. Each of these aspects of the present invention is described in more detail in the following paragraphs.

Foamable EPDM Compositions

The present invention provides foamable EPDM compositions comprising:

EPDM;

a carbon black having a CTAB of 50 to 60 m$^2$/g, and a DBP of 90 to 115 cc/100 g; and a blowing agent, wherein the carbon black is present in an amount of 50–250 phr. Preferably, the carbon black is present in an amount of 100–200 phr.

The amount of blowing agent utilized in the foamable EPDM composition of the present invention is an amount sufficient to expand (foam) the resulting composition. Generally, blowing agent is utilized in an amount of 2–15 phr (parts by weight blowing agent to 100 parts by weight EPDM).

EPDM is well known and is commercially available from a variety of sources. Blowing agents, suitable for use in the foamable EPDM composition of the present invention, include any blowing agent compatible with the mixture of EPDM and the carbon black. Suitable blowing agents include, but are not limited to: a liquid or gaseous nitrogen, halogenated hydrocarbon having a boiling point below 25° C.; chemical blowing agents such as azodicarbonamide (AZDC), toluenesulfonyl hydrazide (TSH), oxybis (benzenesulfonylhydrazide) (OBSH), sodium bicarbonate or activated forms thereof; and CELOGEN® blowing agents, such as CELOGEN® AZ 199, CELOGEN® OT and CELOGEN® 754. CELOGEN is a registered mark of Uniroyal Rubber Company.

The foamable EPDM compositions of the present invention may also contain conventional additives such as oils, stabilizers, oxides, acids, curing agent etc. known to those of ordinary skill in the art as useful for incorporation into, and during the formation of, EPDM compositions. Curing agents are added to the composition by admixing prior to curing and prior to shaping or extruding the mixture. Curing agents useful for incorporation into EPDM compositions are known in the art and include any curing agent which is compatible with the EPDM, carbon black and blowing agent utilized.

The foamable EPDM compositions of the present invention may be produced in any manner known to those of ordinary skill in the art for producing EPDM compositions incorporating carbon blacks. One method for producing the compositions of the present invention, utilizing a BR Banbury mixer, is set forth below.

A BR Banbury mixer is started and maintained at a temperature of 45° C. and a rotor speed of 77 RPM. EPDM is added to the mixer and mixed for approximately 30 seconds. Oil, and preferably zinc oxide and stearic acid, or compositions having similar properties, are added to the EPDM and mixed for approximately 2 additional minutes. The carbon black is added to the mixture and the temperature of the mixing chamber is cooled and maintained at a temperature of below approximately 135° C. Blowing agent is preferably added to the EPDM/carbon black mixture. Typically, the carbon black/EPDM mixture is mixed for approximately 4.5 minutes. Blowing agents and curing agents (where utilized) are added to the mixture.

Although one method for producing the foamable EPDM composition of the present invention has been described, the foamable EPDM compositions of the present invention may be produced by other methods for producing polymer or rubber compositions known to those of ordinary skill in the art.

Foamed, Cured EPDM Compositions

The present invention also provides foamed, cured EPDM compositions comprising:

EPDM and 50–250 phr of a carbon black having a CTAB of 50 to 60 m$^2$/g, and a DBP of 90 to 115 cc/100 g wherein the carbon black is present in an amount of 50–250 phr. Preferably, the carbon black is present in an amount of 100–200 phr.

The foamed, cured EPDM compositions of the present invention yield sponge profiles having lower sponge density, smoother surface appearance (by visual inspection), lower sponge compression set, and other improved properties in comparison with EPDM compositions incorporating similar amounts of conventional low reinforcing carbon blacks.

As set forth above, EPDM is well known and commercially available from a variety of sources. In order to produce a foamed, cured EPDM composition of the present invention, the EPDM and carbon black are mixed, utilizing techniques generally known to those of ordinary skill in the art. A blowing agent is admixed with the EPDM and carbon black to provide the "foamed" characteristic. Suitable blowing agents include any blowing agent compatible with the EPDM and carbon black such as those listed above with respect to the foamable EPDM composition of the present invention. The amount of blowing agent incorporated into the mixture of EPDM and carbon black is an amount sufficient to expand (foam) the resulting composition. Generally, blowing agent is utilized in an amount of 2–15 phr.

The foamed, cured EPDM compositions of the present invention may also contain conventional additives such as oils, stabilizers, oxides, acids, curing agents etc. known to those of ordinary skill in the art as useful for incorporation into, and during the formation of, EPDM compositions. Curing agents are added to the composition by admixing prior to curing and prior to shaping or extruding the mixture. Curing agents useful for incorporation into foamed, cured EPDM compositions of the present invention, are known in the art and include any curing agent compatible with the EPDM, carbon black and blowing agent utilized.

The foamed, cured EPDM compositions of the present invention may be produced utilizing conventional techniques, such as the techniques described above with reference to the EPDM compositions of the present invention. After admixing of the EPDM, carbon black, blowing agent, and additives (if any) the compositions may be extruded or shaped prior to curing, utilizing conventionally available means. Curing may be carried out utilizing any equipment commercially available for UHF microwave. One method, which includes an extrusion step, for curing an EPDM composition, to produce a foamed, cured EPDM composition of the present invention, is as follows, utilizing a commercial Cober UHF microwave curing line (microwave frequency at 2450 MHz).

A foamable EPDM composition is preformed by means of an extruder; then the extruded profile is fed through a hot air tunnel to preheat and precure the skin of the profile. The EPDM profile is foamed and cured in a UHF microwave curing chamber at appropriate microwave power, and the EPDM profile is then continuously post cured in another hot air tunnel at the end of the line to stabilize the profile.

Although one method for producing the foamed, cured EPDM composition of the present invention has been described, the foamed, cured EPDM compositions of the present invention may be produced by other methods for producing polymer or rubber compositions known to those of ordinary skill in the art.

Processes For Producing Foamed, Cured EPDM Compositions

The present invention further provides a process for producing foamed, cured EPDM compositions comprising:

mixing EPDM, a carbon black having a CTAB of 50 to 60 $m^2/g$, and a DBP of 90 to 115 cc/100 g and a blowing agent and foaming and curing the resulting mixture, wherein the carbon black is present in an amount of 50–250 phr, preferably 100–200 phr. Preferably the process further comprises the step of extruding or shaping the resulting mixture of the EPDM, the carbon black and the blowing agent prior to foaming and curing. Also preferred is curing the resulting mixture of the EPDM, the carbon black and the blowing agent, or the shaped or extruded mixture, utilizing UHF microwaves.

The amount of blowing agent utilized in the process is an amount sufficient to expand (foam) the resulting composition. Generally, blowing agent is utilized in an amount of 2–15 phr.

The process for producing foamed, cured EPDM compositions of the present invention may further comprise the step of mixing an additive with the mixture of EPDM, carbon black and blowing agent. Additives suitable for use in the process of the present invention include conventional additives such as oils, stabilizers, oxides, acids, curing agent etc. known to those of ordinary skill in the art as useful for incorporation into, and during the formation of, EPDM compositions. Curing agents are added to the composition by admixing prior to curing and prior to shaping or extruding the mixture. Curing agents useful for incorporation into EPDM compositions are known in the art and include any curing agent that is compatible with the EPDM, carbon black and blowing agent utilized.

The mixing of the EPDM, carbon black, blowing agent and additive(s) (if any) may be performed in any manner known to those of ordinary skill in the art. One method for mixing, utilizing a BR Banbury mixer, is described above with reference to the EPDM compositions of the present invention.

In a preferred process of the present invention the process further comprises the step of extruding or shaping the resulting mixture of EPDM, carbon black, blowing agent and additive(s) if any. The extruding or shaping process step may be performed utilizing any conventional means, such as the means described above with reference to the foamed, cured EPDM compositions of the present invention, or the means described in the following Example 2.

In another preferred process of the present invention, the resulting mixture of EPDM, carbon black, blowing agent and additive(s), if any, is cured utilizing UHF microwave curing.

In a more preferred process of the present invention, the resulting mixture of EPDM, carbon black, blowing agent and additive(s), if any, is extruded or shaped and then cured utilizing UHF microwave curing.

The UHF microwave curing step of the process of the present invention may be performed utilizing any equipment commercially available for UHF microwave. Generally, the mixture of EPDM, carbon black, blowing agent and additive (s), if any, is cured at a frequency, and for a period of time, such that the resulting foamed, cured EPDM composition will have the properties desired for the intended end use. In a preferred embodiment of the process of the present invention, the UHF microwave curing step occurs at a frequency, and for a period of time, such that the foamed, cured EPDM composition will have lower sponge density, smoother surface appearance, lower sponge compression set and other improved properties in comparison with EPDM compositions incorporating conventional low reinforcing carbon blacks at equivalent loadings. Suitable UHF microwave frequencies include, but are not limited to, frequencies of 300 to 300,000 MHz, with 2450 MHz being a typical frequency. One suitable method of curing, which includes an extrusion step, is the method described above with reference to the foamed, cured EPDM compositions of the present invention.

As will be recognized by those of ordinary skill in the art from the foregoing description, the process for producing foamed, cured EPDM compositions of the present invention may be utilized to produce the foamed, cured EPDM compositions of the present invention. It should be further recognized that although the process of the present invention has been described with reference to particular means for mixing, extruding or shaping, and curing, the process is not limited to the means described and includes any conventional means for mixing, extruding or shaping and curing EPDM compositions.

Use of Foamed, Cured EPDM Compositions As Weatherstripping

In addition, the present invention relates to the use of the foamed, cured EPDM compositions of the present invention as weatherstripping. The process for weatherstripping comprises:

sealing a surface with a foamed, cured EPDM composition comprising EPDM and a carbon black having a CTAB of 50 to 60 $m^2/g$, and a DBP of 90 to 115 cc/ 100 g, wherein the carbon black is present in an amount of 50–250 phr, preferably 100–200 phr.

The sealing step of the method for weatherstripping of the present invention may be performed in any manner known to those of ordinary skill in the art, including conventional manners for sealing a surface with weatherstripping.

The foamed, cured EPDM composition may be produced in any conventional manner for producing foamed, cured EPDM compositions and in particular by the methods described above with reference to the foamed, cured EPDM compositions of the present invention, and the process of the present invention. The foamed, cured EPDM composition may additionally include additives, such as the additives referred to above with reference to the foamed, cured EPDM compositions of the present invention.

The effectiveness and advantages of various aspects and embodiments of the present invention will be further illustrated by the following examples wherein the following testing procedures were utilized.

Analysis of the Carbon Blacks

The following testing procedures were utilized in the determination and evaluation of the analytical properties of the carbon blacks utilized in the following examples. The DBP (dibutyl phthalate adsorption value) of the carbon black was determined according to the procedure set forth in ASTM D2414. The $I_2$ No. (iodine adsorption number) of the carbon blacks was determined according to ASTM D1510. CTAB (cetyltrimethyl ammonium bromide) absorption value of the carbon blacks was determined according to ASTM Test Procedure D3765-85. Tinting strength (Tint) of the carbon blacks was determined according to ASTM Test Procedure D3265-85a. The CDBP (dibutyl phthalate adsorption value) of the crushed carbon blacks was determined according to the procedure set forth in ASTM D3493-86.

Evaluation of EPDM Compositions

The following testing procedures were utilized in the evaluation of the performance properties of the EPDM compositions of the following examples.

UHF microwave receptivity was measured on a Dielecmetre (supplied by Total Elastomers in France). The UHF microwave receptivity is characterized by a coefficient, α, which is defined as $$\alpha = (150° C. - 80° C.)/(t_{150} - t_{80})[°C./s]$$

where $t_{150}$ and $t_{80}$ are the times needed for samples to reach 150° and 80° C. respectively. α is the heating rate between temperatures 80° and 150° C.

The performance of the foamed, cured EPDM compositions was evaluated using the following procedures.

a) Sponge Density

The sponge density was measured in terms of lbs/ft³ using the following method.

1) The sponge sample was weighed and the weight recorded in grams;

2) The sample was completely immersed in a graduated cylinder of water (the cylinder was graduated in milliliters (ml)) and the increase in volume (volume of water displaced by the sponge sample) was recorded;

3) The sponge density was then calculated from the following relationship:

Sponge Density (lbs/ft³)=(weight/volume (g/ml))×62.4 (conversion factor)

b) Sponge Compression Set

Sponge compression set measures the ability of rubber compositions to retain elastic properties after subjecting a sample to a constant deflection for a specified time and temperature. The sponge compression set was measured utilizing the following procedure with a compression device that consists of 2 parallel plates between which the samples are compressed. The deflection is obtained by lowering the upper plate to the height of the spacers.

The sponge profile was inserted, heightwise, between the metal plates of the holder. Three spacers were placed to achieve 50% compression between the specimens. The bolts of the holder were tightened so that the plates rest firmly on the spacers. The compressive device containing the samples, was placed in an oven and maintained at 158° F. for 22 hours. After the 22 hour heating period, the compressive device was removed from the oven and the samples were immediately removed from the compressive device. The samples were cooled for 30 minutes and then their height was measured to the nearest 0.001 inch. The compression set is calculated as Sponge Compression Set=$(T_0-T_1)/(T_0-T_S)\times 100\%$ where $T_0$=original sponge height
$T_1$=final sponge height
$T_S$=Thickness of spacer used.

EXAMPLE 1

This example illustrates the greater receptivity to UHF microwaves of EPDM compositions incorporating carbon blacks typical of the carbon blacks specified in the compositions and processes of the present invention, in comparison to EPDM compositions incorporating conventional low reinforcing carbon blacks.

Eight EPDM compositions were prepared by incorporating four different carbon blacks at each of two different loading levels into EPDM. Carbon blacks A and B were utilized to produce EPDM compositions RA1–RA2 and RB1–RB2 respectively. Two control carbon blacks, C and D, were utilized to produce EPDM compositions RC1–RC2 and RD1–RD2 respectively. The analytical properties of the carbon blacks A–D were as shown in Table 1 below:

TABLE 1

Analytical Properties of Carbon Blacks A, B, C and D

| Carbon Black | A | B | C<br>ASTM N550 | D<br>ASTM N660 |
|---|---|---|---|---|
| $I_2$ No.(mg/g) | 56 | 56 | 43 | 36 |
| CTAB (m²/g) | 53 | 54 | 42 | 38 |
| DBP(cc/100 g) | 113 | 95 | 121 | 90 |
| CDBP(cc/100 g) | 84 | 78 | 84 | 74 |
| Tint(%) | 77 | 78.4 | 62 | 60 |

The EPDM compositions RA1, RA2, RB1, RB2, RC1, RC2, RD1 and RD2 were prepared by incorporating each carbon black, at 150 phr and 200 phr, into the EPDM composition shown below in Table 2. In the composition of Table 2, no blowing agent is utilized in order to allow evaluation of the UHF microwave receptivity of each of the EPDM compositions.

TABLE 2

EPDM Composition

EPDM Composition/Parts By Weight

| INGREDIENT | RA1 | RA2 | RB1 | RB2 | RC1 | RC2 | RD1 | RD2 |
|---|---|---|---|---|---|---|---|---|
| EPDM* | 100 | 100 | 100 | 100 | 100 | 100 | 100 | 100 |
| carbon black | 150 | 200 | 150 | 200 | 150 | 200 | 150 | 200 |
| Sunpar 2280 Oil* | 100 | 100 | 100 | 100 | 100 | 100 | 100 | 100 |
| zinc oxide | 5 | 5 | 5 | 5 | 5 | 5 | 5 | 5 |
| stearic Acid | 1 | 1 | 1 | 1 | 1 | 1 | 1 | 1 |
| TMTDS* | 2.7 | 2.7 | 2.7 | 2.7 | 2.7 | 2.7 | 2.7 | 2.7 |
| Butyl Zimate* | 2.7 | 2.7 | 2.7 | 2.7 | 2.7 | 2.7 | 2.7 | 2.7 |
| Methyl Zimate* | 2.7 | 2.7 | 2.7 | 2.7 | 2.7 | 2.7 | 2.7 | 2.7 |
| sulfur | 0.5 | 0.5 | 0.5 | 0.5 | 0.5 | 0.5 | 0.5 | 0.5 |
| Sulfasan R* | 1.7 | 1.7 | 1.7 | 1.7 | 1.7 | 1.7 | 1.7 | 1.7 |

EPDM: EXXON VISTALON® 5600, manufactured and sold by EXXON Corporation, Wilmington, Delaware;
Sunpar 2280: A trademarked oil manufactured and sold by Sun oil Company;
TMTDS: tetramethylthiuram disulfide;
Butyl Zimate: a trademarked zinc dibutyldithiocarbamate manufactured and sold by R. T. Vanderbilt Co.;
Methyl Zimate: A trademarked zinc dimethyldithiocarbamate manufactured and sold by R. T. Vanderbilt Co.;
Sulfasan R - a trademarked 4,4'-dithiodimorpholine, manufactured and sold by Monsanto Co., St. Louis, Missouri.

All of the EPDM compositions in Table 2 (RA1 through RD2) were produced as follows. A BR Banbury mixer was started and maintained at a temperature of 45° C. and a rotor speed of 77 RPM. The EPDM was added to the mixer and mixed for approximately 30 seconds. The Sunpar 2280 oil, zinc oxide and stearic acid, were added to the EPDM and mixed for approximately 2 additional minutes. The carbon black was added to the mixture and the temperature of the mixing chamber was cooled and maintained at a temperature of below approximately 135° C. The resulting mixture was mixed for approximately 4.5 minutes and then the TMTDS, sulfur and Butyl Zimate, Methyl Zimate and Sulfasan R products were added to the mixture. The resulting mixture was mixed for approximately 1.5 minutes while the temperature was maintained at below approximately 135° C.

The UHF microwave receptivity, as characterized by "α", of each EPDM composition of Table 2 was measured using the analytical techniques described herein. The results are shown in Table 3 below:

TABLE 3

The α Coefficient (°C/sec) of EPDM Compositions Containing Carbon Blacks at Two Different Loadings

| EPDM Composition | RA1 | RA2 | RB1 | RB2 | RC1 | RC2 | RD1 | RD2 |
|---|---|---|---|---|---|---|---|---|
| Carbon Black | A | A | B | B | C | C | D | D |
| Loading | 150 | 200 | 150 | 200 | 150 | 200 | 150 | 200 |
| α (°C/s) | 13.52 | 12.02 | 13.86 | 14.0 | 6.27 | 4.52 | 4.87 | 6.45 |

As shown in Table 3, EPDM compositions RA1, RA2, RB1 and RB2, incorporating carbon blacks typical of the carbon blacks incorporated in the EPDM compositions of the present invention, had higher α values at both 150 and 200 parts by weight, than the EPDM compositions RC1, RC2, RD1 and RD2 incorporating similar amounts of conventional carbon blacks. From these results, it is apparent that any compositions incorporating EPDM and carbon blacks typical of the carbon blacks incorporated into the EPDM compositions of the present invention, will heat faster than EPDM compositions incorporating similar amounts of conventional carbon blacks.

EXAMPLE 2

Three foamed, cured EPDM compositions were prepared using carbon blacks A, B, C and D set forth in Table 1. Foamed, cured EPDM composition RE was prepared incorporating 130 phr carbon black A. Foamed, cured EPDM composition RF was prepared incorporating 130 phr carbon black B. Foamed, cured EPDM composition RG was prepared incorporating a blend of 20 phr carbon black C and 110 phr carbon black D.

The foamed, cured EPDM compositions RE, RF and RG were prepared by incorporating the carbon blacks A–D into the foamable EPDM composition set forth in Table 4 below, and foaming and curing the composition as described in the paragraphs following Table 4:

TABLE 4

Foamable EPDM Composition

| | EPDM Composition/Parts By Weight | | |
|---|---|---|---|
| INGREDIENT | RE | RF | RG |
| ROYALENE ® 525* | 100.0 | 100.0 | 100.0 |
| Carbon Black A | 130.00 | — | — |
| Carbon Black B | — | 130.00 | — |
| Carbon Black C | — | — | 20.00 |
| Carbon Black D | — | — | 110.00 |
| Sunpar 2280 Oil* | 90.00 | 90.00 | 90.00 |
| whiting | 30.00 | 30.00 | 30.00 |
| zinc Oxide | 4.00 | 4.00 | 4.00 |
| stearic Acid | 1.00 | 1.00 | 1.00 |
| MBT* | 1.70 | 1.70 | 1.70 |
| CELOGEN ® AZ 199* | 7.00 | 7.00 | 7.00 |
| sulfur | 2.00 | 2.00 | 2.00 |
| Sulfads* | 1.70 | 1.70 | 1.70 |

TABLE 4-continued

Foamable EPDM Composition

| | EPDM Composition/Parts By Weight | | |
|---|---|---|---|
| INGREDIENT | RE | RF | RG |
| Butazate Nuggets* | 1.70 | 1.70 | 1.70 |
| Ethyl Tellurac* | 1.00 | 1.00 | 1.00 |
| Brown Factice* | 15.00 | 15.00 | 15.00 |
| TE-28 G9* | 2.00 | 2.00 | 2.00 |

ROYALENE ® 525: EPDM, manufactured and sold by Uniroyal Chemical Company
Sunpar 2280 Oil: A trademarked oil manufactured and sold by Sun Oil Company
TE-28 G9: processing aid
MBT: 2-mercaptobenzothiazole, used as an accelerator
Brown Factice: vulcanized vegetable oil, used as an extender and plasticizer
Ethyl Tellurac: tellurium diethyldithiocarbamide, used as an accelerator
Butazate Nuggets: zinc dibutyldithio carbamate, used as an accelerator
Sulfads: dipenta methylene thiuram tetrasulfide, used as an accelerator and sulfur donor
CELOGEN ® AZ 199: azodicarbonamide, manufactured by Uniroyal Chemical Company, used as a blowing agent.

The foamable EPDM compositions of Table 4 were heated and cured using a commercial Cober UHF microwave curing line with the microwave frequency set at 2450 MHz. The foamable EPDM compositions were preformed through an extruder and then passed through a hot air tunnel. The foamable EPDM compositions were then foamed and cured by heating in the UHF microwave curing chamber at 2450 MHz. The microwave power supply was set at 4.8 KW (kilowatts). The inlet temperature of the foamable EPDM compositions at the entrance to the UHF microwave curing chamber was 240° F. After foaming and curing, the EPDM profile was post cured by passing through a second hot air tunnel at the end of the line.

In order to evaluate the temperature rise produced by UHF microwave heating for each of the foamed, cured EPDM compositions (sponge profile), the temperature of the foamed, cured EPDM compositions was measured at the outlet of the UHF microwave curing chamber. As set forth above, the inlet temperature was also measured as the foamable EPDM compositions entered the UHF microwave curing chamber. The results are set forth in Table 5.

TABLE 5

TEMPERATURE RISE DURING UHF MICROWAVE HEATING
(@ Constant Inlet Temperature ($T_1$) and Power Input 4.8 KW)

| Foamed, Cured EPDM Composition | Carbon Black | $T_1$ (°F.) | $T_2$ (°F.) |
|---|---|---|---|
| RE | A(130 phr) | 240 | 435 |
| RF | B(130 phr) | 240 | 435 |
| RG | C/D(20/100 phr) | 240 | 400 |

As shown in Table 5, foamed, cured EPDM compositions RE and RF of the present invention, showed higher temperature rise (at constant Microwave power supply 4.8 KW and constant inlet temperature, $T_1$, 240 F) than foamed, cured EPDM composition RG incorporating a similar amount of a conventional blend of carbon blacks. The higher temperature rise results indicate that foamed, cured EPDM compositions of the present invention, RE and RF, have higher UHF microwave receptivity than EPDM composition RG incorporating a similar amount of a conventional blend of carbon blacks. These results further confirm the results obtained in example 1.

The performance, in terms of sponge density and sponge compression set, of each of the foamed, cured EPDM compositions RE, RF and RG was also evaluated using the techniques described herein. The results are set forth in Table 6.

TABLE 6

SPONGE CHARACTERISTICS OF
FOAMED CURED EPDM COMPOSITIONS

| Foamed, Cured EPDM Composition | Carbon Black | Sponge Density (lbs/ft³) | Sponge Compression Set (%) |
|---|---|---|---|
| RE | A(130 phr) | 36.9 | 7.7 |
| RF | B(130 phr) | 33.0 | 6.0 |
| RG | C/D(20/100 phr) | 38.7 | 11.0 |

As shown in Table 6, the sponge density of the foamed, cured EPDM compositions of the present invention, RE and RF is lower than the sponge density of foamed, cured EPDM composition RG incorporating a similar amount of a conventional blend of carbon blacks. The lower sponge density of the foamed, cured EPDM compositions of the present invention RE and RF is preferred in a weatherstrip application.

As also shown in Table 6, the foamed, cured EPDM compositions of the present invention, RE and RF, had a lower sponge compression set than foamed, cured EPDM composition RG incorporating a similar amount of a conventional blend of carbon blacks. The lower compression set of the foamed, cured EPDM compositions of the present invention RE and RF is also preferred in a weatherstrip application.

In addition, the foamed, cured EPDM compositions of the present invention, RE and RF, are characterized as having smoother surfaces than foamed, cured EPDM composition RG, as determined by visual inspection.

It should be clearly understood that the forms of the present invention herein described are illustrative only and are not intended to limit the scope of the invention.

We claim:

1. A process for producing foamed, cured EPDM compositions comprising:

mixing EPDM, a carbon black having a CTAB of 50 to 60 m²/g, and a DBP of 90 to 115 cc/100 g and a blowing agent, and foaming and curing the resulting mixture, wherein the carbon black is present in an amount of 50–250 phr.

2. The process of claim 1 further comprising the step of extruding or shaping the resulting mixture of the EPDM, the carbon black and the blowing agent prior to foaming and curing.

3. The process of claim 1 wherein the mixture is cured utilizing UHF microwaves.

4. The process of claim 2 wherein the mixture is cured utilizing UHF microwaves.

5. The process of claim 4 wherein the carbon black is present in an amount of 100–200 phr.

6. A process for weatherstripping a surface comprising:

sealing the surface with a foamed, cured EPDM composition comprising EPDM and a carbon black having a CTAB of 50 to 60 m²/g, and a DBP of 90 to 115 cc/100 g, wherein the carbon black is present in an amount of 50–250 phr.

7. The process for weatherstripping of claim 6 wherein carbon black is present in an amount of 100–200 phr.

* * * * *